United States Patent
Lamarre et al.

(10) Patent No.: US 11,131,211 B2
(45) Date of Patent: *Sep. 28, 2021

(54) METHOD AND SYSTEM FOR SETTING AN ACCELERATION SCHEDULE FOR ENGINE START

(71) Applicant: PRATT & WHITNEY CANADA CORP., Longueuil (CA)

(72) Inventors: Sylvain Lamarre, Boucherville (CA); Pierre Alexandre, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 181 days.

This patent is subject to a terminal disclaimer.

(21) Appl. No.: 16/433,280

(22) Filed: Jun. 6, 2019

(65) Prior Publication Data
US 2019/0284953 A1   Sep. 19, 2019

Related U.S. Application Data

(63) Continuation of application No. 15/591,696, filed on May 10, 2017, now Pat. No. 10,352,189.

(51) Int. Cl.
*F01D 19/00* (2006.01)
*F02C 7/26* (2006.01)
(Continued)

(52) U.S. Cl.
CPC .............. *F01D 19/00* (2013.01); *B64D 27/16* (2013.01); *F02C 7/26* (2013.01); *F02C 9/28* (2013.01);
(Continued)

(58) Field of Classification Search
CPC .............. F05D 2270/04; F05D 2260/85; F05D 2220/323; F02C 7/26; F02C 9/28; B64D 27/16; F01D 19/00
(Continued)

(56) References Cited

U.S. PATENT DOCUMENTS

| 4,321,791 A | 3/1982 | Carroll |
| 4,593,523 A * | 6/1986 | Hawes ...................... F02C 9/28 60/39.281 |

(Continued)

FOREIGN PATENT DOCUMENTS

| CA | 2799673 A1 * | 8/2013 | ................ F02C 9/00 |
| CA | 2884233 A1 * | 3/2014 | .............. F02C 7/264 |

(Continued)

OTHER PUBLICATIONS

Extended European Search Report dated Oct. 2, 2018 in connection with European application No. 18171688.7.

*Primary Examiner* — Atul Trivedi
(74) *Attorney, Agent, or Firm* — Norton Rose Fulbright Canada LLP

(57) ABSTRACT

Herein provided are methods and systems for setting an acceleration schedule for engine start of a gas turbine engine. A rotational acceleration measurement of the engine is obtained after the engine is energized in response to a start request. The rotational acceleration measurement of the engine is compared to a threshold value within an acceleration band having a maximum threshold and a minimum threshold. An acceleration schedule is determined based on a position of the rotational acceleration measurement of the engine in the acceleration band relative to the threshold value.

20 Claims, 5 Drawing Sheets

(51) Int. Cl.
   *F02C 9/28* (2006.01)
   *B64D 27/16* (2006.01)
(52) U.S. Cl.
   CPC .... *F05D 2220/323* (2013.01); *F05D 2260/85* (2013.01); *F05D 2270/04* (2013.01)
(58) Field of Classification Search
   USPC .......................................................... 701/100
   See application file for complete search history.

(56) References Cited

U.S. PATENT DOCUMENTS

| | | | | |
|---|---|---|---|---|
| 4,648,797 | A * | 3/1987 | Martin | F02C 9/28 |
| | | | | 416/27 |
| 5,129,221 | A | 7/1992 | Walker et al. | |
| 5,907,949 | A | 6/1999 | Falke et al. | |
| 6,988,368 | B2 | 1/2006 | O'Connor | |
| 10,378,452 | B1 * | 8/2019 | Barmichev | F02K 5/00 |
| 2006/0042590 | A1 * | 3/2006 | Uplap | F02D 41/10 |
| | | | | 123/352 |
| 2006/0129301 | A1 * | 6/2006 | Ashby | F02C 9/28 |
| | | | | 701/100 |
| 2007/0084214 | A1 * | 4/2007 | Schmidt | F02C 7/32 |
| | | | | 60/778 |
| 2008/0276620 | A1 * | 11/2008 | Ullyott | F01D 21/06 |
| | | | | 60/773 |
| 2008/0279675 | A1 * | 11/2008 | Ullyott | F02C 9/46 |
| | | | | 415/1 |
| 2010/0083632 | A1 * | 4/2010 | Foster | B64D 27/16 |
| | | | | 60/39.181 |
| 2010/0083669 | A1 * | 4/2010 | Foster | B64D 31/04 |
| | | | | 60/802 |
| 2010/0168952 | A1 * | 7/2010 | Falkmann | F02C 9/00 |
| | | | | 701/31.4 |
| 2011/0041510 | A1 | 2/2011 | Sasaki et al. | |
| 2011/0208400 | A1 * | 8/2011 | Lickfold | B64D 31/06 |
| | | | | 701/100 |
| 2013/0073127 | A1 * | 3/2013 | Kumar | B60W 20/50 |
| | | | | 701/22 |
| 2013/0199197 | A1 * | 8/2013 | Beaud | F02C 9/18 |
| | | | | 60/773 |
| 2015/0211421 | A1 | 7/2015 | Harriet | |
| 2016/0195017 | A1 * | 7/2016 | Vick | F02C 7/22 |
| | | | | 60/39.511 |
| 2017/0002744 | A1 * | 1/2017 | Poumarede | H02K 23/00 |
| 2017/0158324 | A1 * | 6/2017 | Schlak | B64C 37/00 |
| 2018/0283203 | A1 * | 10/2018 | Manepalli | F01D 5/12 |
| 2018/0328220 | A1 * | 11/2018 | Lamarre | F02C 9/28 |
| 2019/0002115 | A1 * | 1/2019 | Miller | B64D 35/08 |
| 2019/0052205 | A1 * | 2/2019 | Noderer | F01D 15/10 |
| 2019/0052206 | A1 * | 2/2019 | Noderer | H02P 9/008 |
| 2019/0052208 | A1 * | 2/2019 | Noderer | H02P 9/10 |
| 2019/0322379 | A1 * | 10/2019 | Mackin | B64D 31/06 |
| 2019/0323426 | A1 * | 10/2019 | Mackin | F02C 9/20 |
| 2019/0323427 | A1 * | 10/2019 | Mackin | F02C 7/36 |
| 2020/0031480 | A1 * | 1/2020 | Baig | B60L 50/61 |
| 2020/0056551 | A1 * | 2/2020 | Epstein | F02C 9/48 |
| 2020/0131995 | A1 * | 4/2020 | Trawick | G01M 15/14 |
| 2020/0173367 | A1 * | 6/2020 | Husband | F02C 7/266 |
| 2020/0173368 | A1 * | 6/2020 | Husband | F01D 19/00 |
| 2020/0173369 | A1 * | 6/2020 | Husband | F02C 9/00 |
| 2020/0290745 | A1 * | 9/2020 | Hon | B64D 27/24 |
| 2020/0354068 | A1 * | 11/2020 | Razak | B64D 31/14 |
| 2021/0017915 | A1 * | 1/2021 | Donini | F02C 9/28 |
| 2021/0095636 | A1 * | 4/2021 | Seminel | B64C 11/306 |

FOREIGN PATENT DOCUMENTS

| | | | | |
|---|---|---|---|---|
| CN | 110886656 | A * | 3/2020 | |
| EP | 2339127 | | 6/2011 | |
| EP | 2910739 | A1 * | 8/2015 | ............ H02P 9/007 |
| EP | 2878795 | B1 * | 8/2016 | ............ F02K 3/025 |
| EP | 3401530 | A1 * | 11/2018 | ............ F01D 19/00 |
| EP | 3403933 | A1 * | 11/2018 | ............ B64D 27/16 |
| EP | 3772148 | A1 * | 3/2021 | ............ H02J 1/10 |
| FR | 2968716 | A1 * | 6/2012 | ............ F02C 7/26 |
| FR | 2995345 | A1 * | 3/2014 | ............ F01D 19/00 |
| FR | 3025252 | A1 * | 3/2016 | ............ F02C 9/263 |
| GB | 2520378 | A * | 5/2015 | ............ H02K 19/28 |
| WO | WO-2015133994 | A1 * | 9/2015 | ............ F02C 6/14 |
| WO | WO-2016040964 | A1 * | 3/2016 | ............ F02C 7/052 |
| WO | WO-2017162197 | A1 * | 9/2017 | ............ G06F 17/15 |

* cited by examiner

METHOD AND SYSTEM FOR SETTING AN ACCELERATION SCHEDULE FOR ENGINE START

CROSS-REFERENCE TO RELATED APPLICATIONS

This application is a continuation of U.S. patent application Ser. No. 15/591,696, filed on May 10, 2017, the contents of which are hereby incorporated by reference.

TECHNICAL FIELD

The present disclosure relates generally to gas turbine engines, and more particularly to starts and re-starts.

BACKGROUND OF THE ART

Turbine engine start and re-start capabilities may be designed based on a characterization performed across the ground and flight envelope and/or based on a simulation model. In some embodiments, the start and re-start processes involve two phases: direct fuel flow control and sub-idle acceleration governing. While in the sub-idle acceleration phase, a control system adjusts the fuel flow to maintain a pre-defined acceleration reference. The objective is to ensure that the proper fuel and acceleration schedules are identified to efficiently start the engine in all conditions while avoiding undesirable engine behaviour, such as compressor stall, overheating, engine hang, or flameout.

The engine start process may involve conflicting requirements. For example, cold engine acceleration requirements may be dictated by compressor stability, while hot or high speed engine restart acceleration must be high enough to prevent engine flameout. For simplicity, fuel and acceleration schedules are sometimes defined as a compromise that results in limiting the aircraft speed for engine restart or simply not achieving the shortest possible time to idle in all cases.

As such, there is room for improvement.

SUMMARY

In one aspect, there is provided a method for setting an acceleration schedule for engine start of a gas turbine engine. The method comprises obtaining a rotational acceleration measurement of the engine after the engine is energized in response to a start request; comparing the rotational acceleration measurement of the engine to a threshold value within an acceleration band having a maximum threshold and a minimum threshold; and determining an acceleration schedule based on a position of the rotational acceleration measurement of the engine in the acceleration band relative to the threshold value.

In another aspect, there is provided a system for setting an acceleration schedule for engine start of a gas turbine engine. The system comprises a processing unit and a non-transitory computer-readable memory having stored thereon program instructions executable by the processing unit. The program instructions executable by the processing unit are for obtaining a rotational acceleration measurement of the engine after the engine is energized in response to a start request; comparing the rotational acceleration measurement of the engine to a threshold value within an acceleration band having a maximum threshold and a minimum threshold; and determining an acceleration schedule based on a position of the rotational acceleration measurement of the engine in the acceleration band relative to the threshold value.

In a further aspect, there is provided a computer readable medium having stored thereon program code executable by a processor for setting a fuel flow schedule for starting a gas turbine engine of an aircraft, the engine having a compressor inlet and a compressor outlet. The program code comprising instructions for: obtaining a rotational acceleration measurement of the engine after the engine is energized in response to a start request; comparing the rotational acceleration measurement of the engine to a threshold value within an acceleration band having a maximum threshold and a minimum threshold; and determining an acceleration schedule based on a position of the rotational acceleration measurement of the engine in the acceleration band relative to the threshold value.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
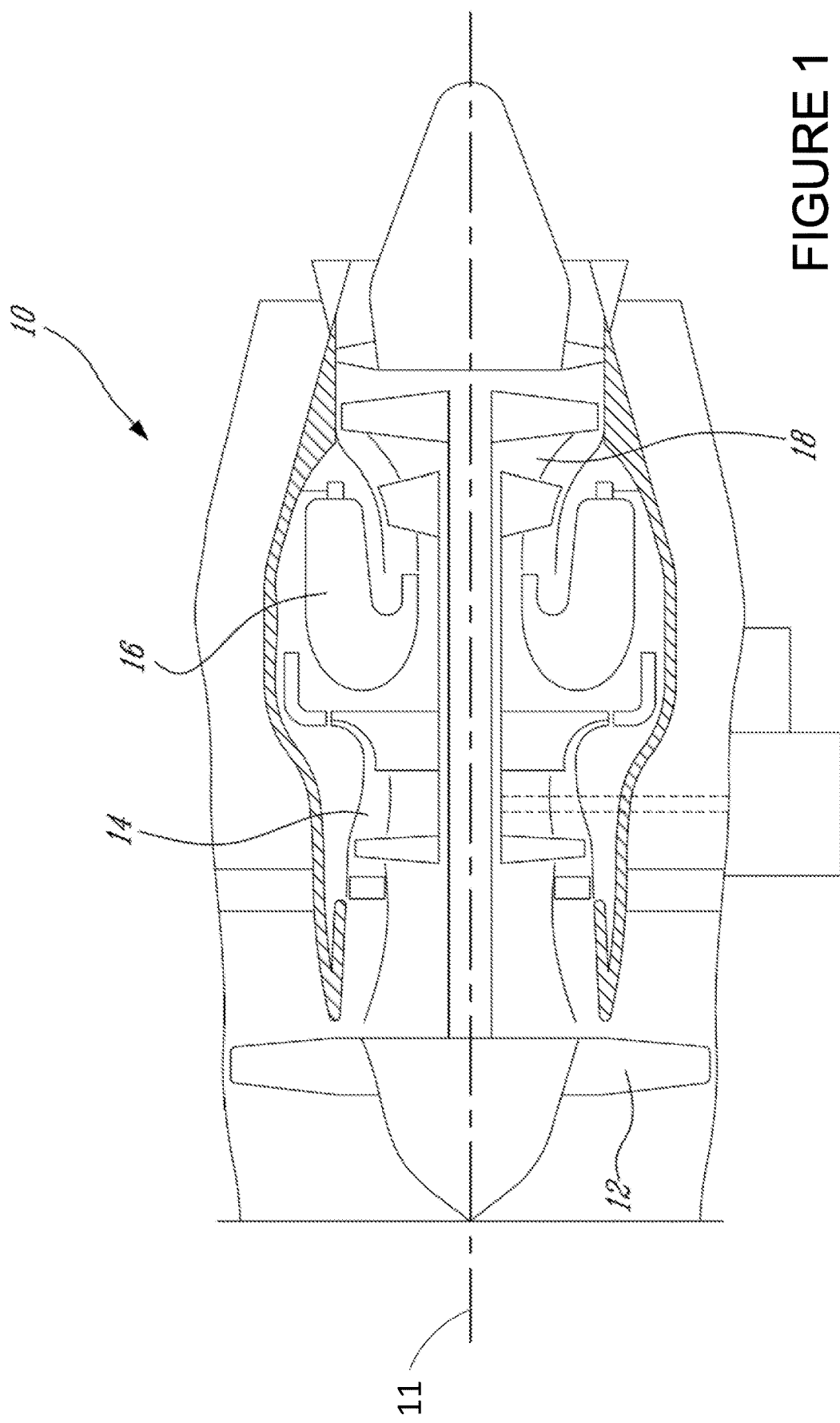
FIG. 1 is a schematic of an example gas turbine engine.

FIG. 1 illustrates a gas turbine engine 10 for which an acceleration schedule may be set for engine start and/or restart using the methods and systems described herein. Note that while engine 10 is a turbofan engine, the acceleration schedule setting methods and systems may be applicable to turboprop, turboshaft, auxiliary power units (APU), and other types of aircraft engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10.

Figure 2:
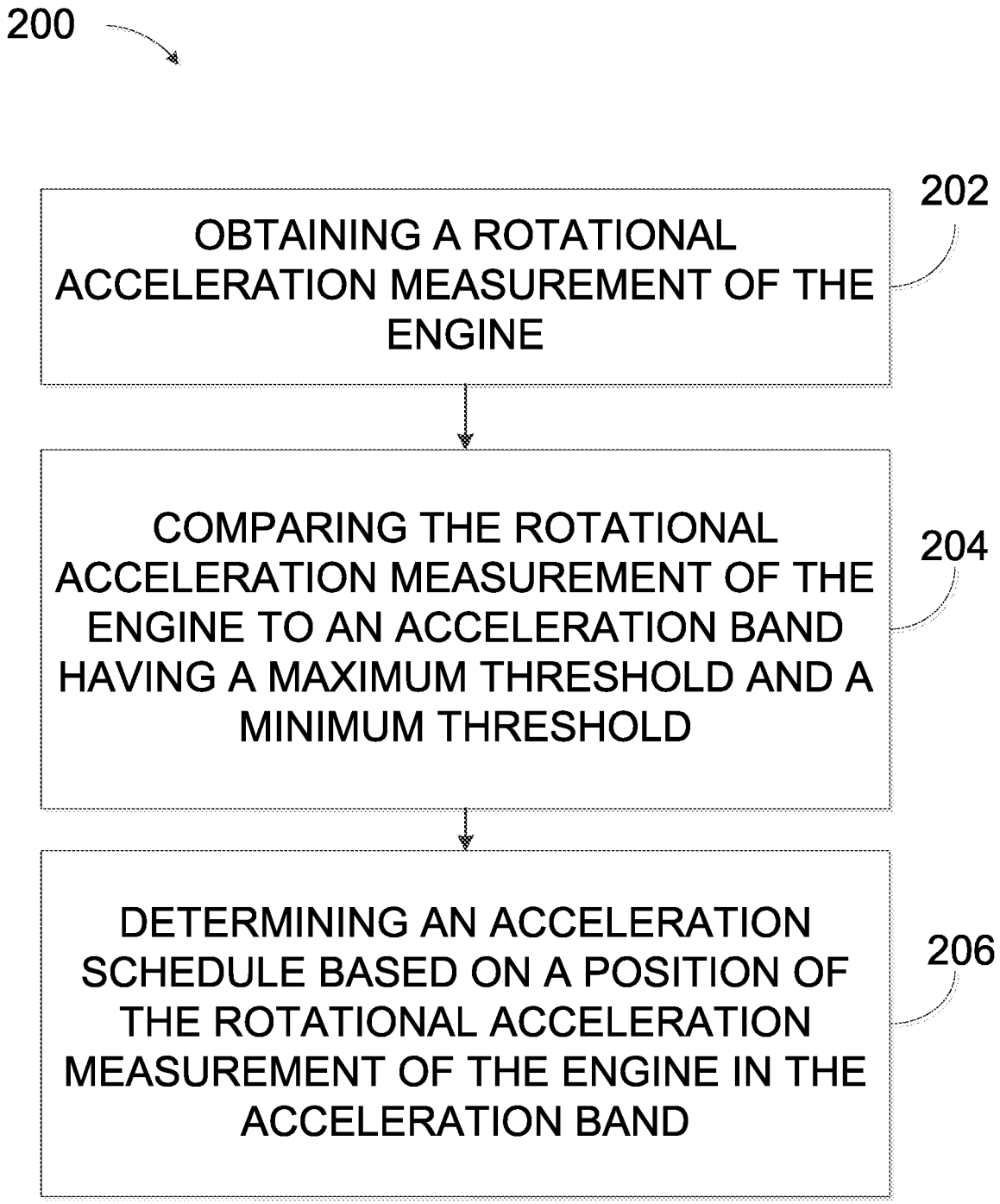
FIG. 2 is a flowchart illustrating an example method for setting an acceleration schedule of the engine of FIG. 1 in accordance with an embodiment.

With reference to FIG. 2, there is illustrated a flowchart of an example method 200 for setting an acceleration schedule for starting a gas turbine engine, such as engine 10 of FIG. 1. Note that the expressions "engine start" and "starting an engine" are used throughout the present disclosure to refer to both engine starts and restarts. The method 200 is used to control the acceleration of the engine 10 in accordance with an acceleration schedule during a sub-idle acceleration phase of the engine 10.

Pre-light-off sub-idle engine acceleration is the result of a plurality of inputs, including but not limited to starter energy, aircraft speed and oil temperature. Starter torque is directly related to starter energy and results from a pneumatic or electrical source, such as a ground cart or a battery. In electrical systems, starter torque varies with battery depletion. Similarly, inlet ram recovery pressurizes the engine compressor inlet and varies with aircraft speed. The accumulated pressure going through the engine spools will provide rotational torque on the engine core, thus affecting the available torque for the engine start. As such, monitoring the sub-idle acceleration, pre-light-off or slightly post-light-off, and comparing it to predetermined thresholds allows the sub-idle acceleration schedule to be set to in accordance with the actual conditions in which the aircraft is operating.

At step 202, a rotational acceleration measurement is obtained after the engine 10 is energized in response to a start request. An engine start request is received and method 200 is triggered. Such start request may be received from an aircraft command system (not illustrated), for example, as activated by a pilot. In response to the start request, the rotational acceleration measurement of the engine 10 is determined. For example a rotational speed of the engine 10 may be obtained via a speed sensor. The rotational speed of the engine may be used to determine the rotational acceleration measurement. In some embodiments, the rotational acceleration measurement is obtained between a time when the engine 10 is energized and a time when light-off occurs, where light-off refers to ignition of the engine 10. In such case, the rotational acceleration measurement obtained may be referred to as a pre-light-off rotational acceleration measurement. Detection of light-off may be done via one or more sensors (not illustrated) associated with the engine 10. In some embodiment, rotational acceleration measurement is obtained at the time of light-off or shortly after light-off.

Figure 3A:
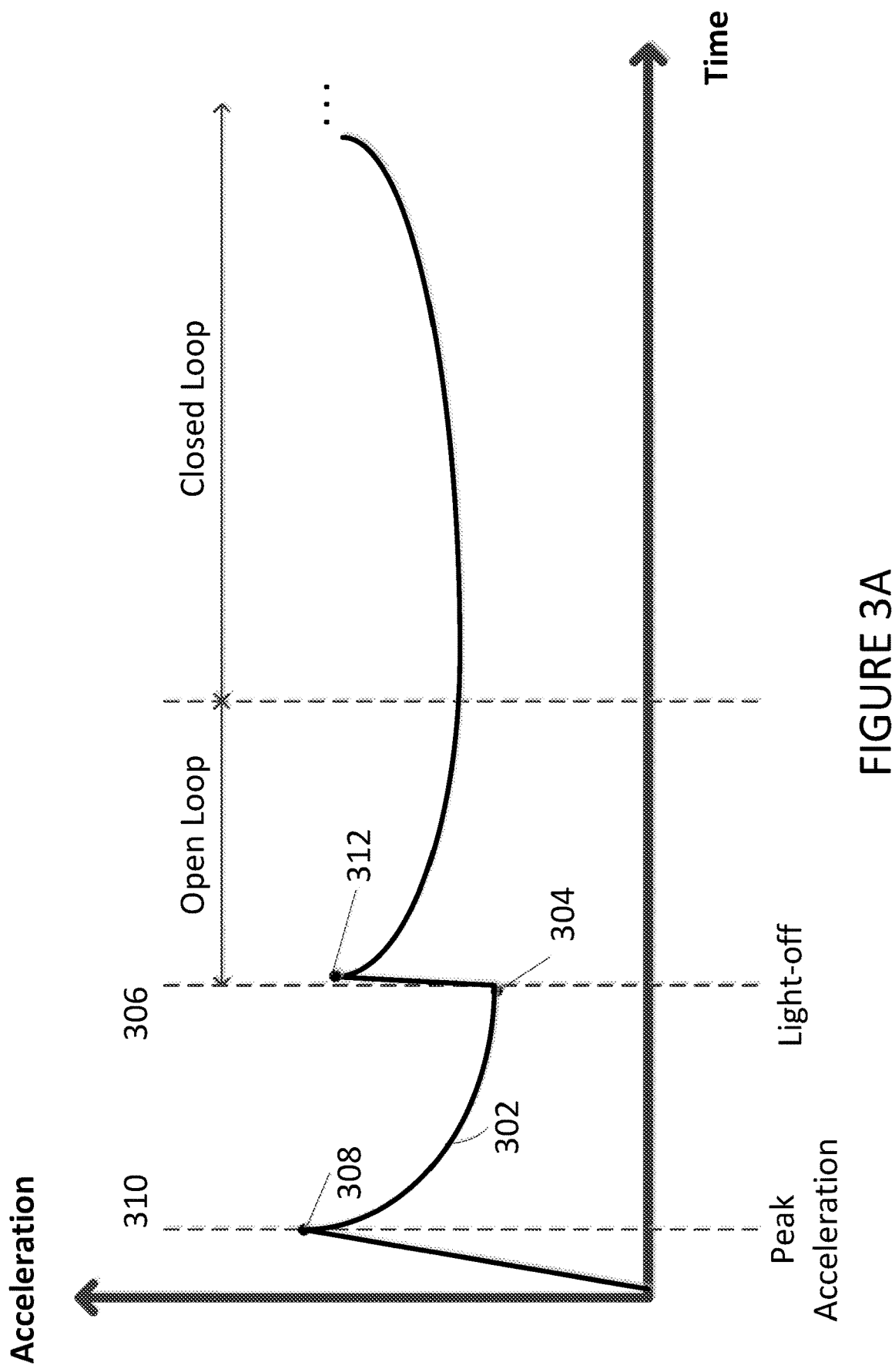
FIG. 3A is an example graphical representation of rotational acceleration.

With additional reference to FIG. 3A, an example graphical representation of a rotational acceleration 302 of the engine 10 is illustrated. In some embodiments, the rotational acceleration measurement is taken from a plurality of rotational acceleration values measured over a period of time. In other embodiments, the rotational acceleration measurement corresponds to a single rotational acceleration value measured at a specific time. For example, in some embodiments, the rotational acceleration measurement is a last measured value 304 before light-off 306. In other embodiments, the rotational acceleration measurement is a peak measured value 308 taken at a peak acceleration time 310 corresponding to peak acceleration of the engine 10 before light-off 306. In some embodiments, the rotational acceleration measurement is a peak acceleration value 312 occurring following light-off 306. That is, the peak acceleration value 312 occurs around light-off either at the time of light-off or shortly thereafter. Accordingly, a plurality of rotational acceleration measured values may be obtained and a specific measured value at any suitable point in time, at a specific engine rotational speed and/or at a specific acceleration condition may be selected as the rotational acceleration measurement.

Figure 3B:
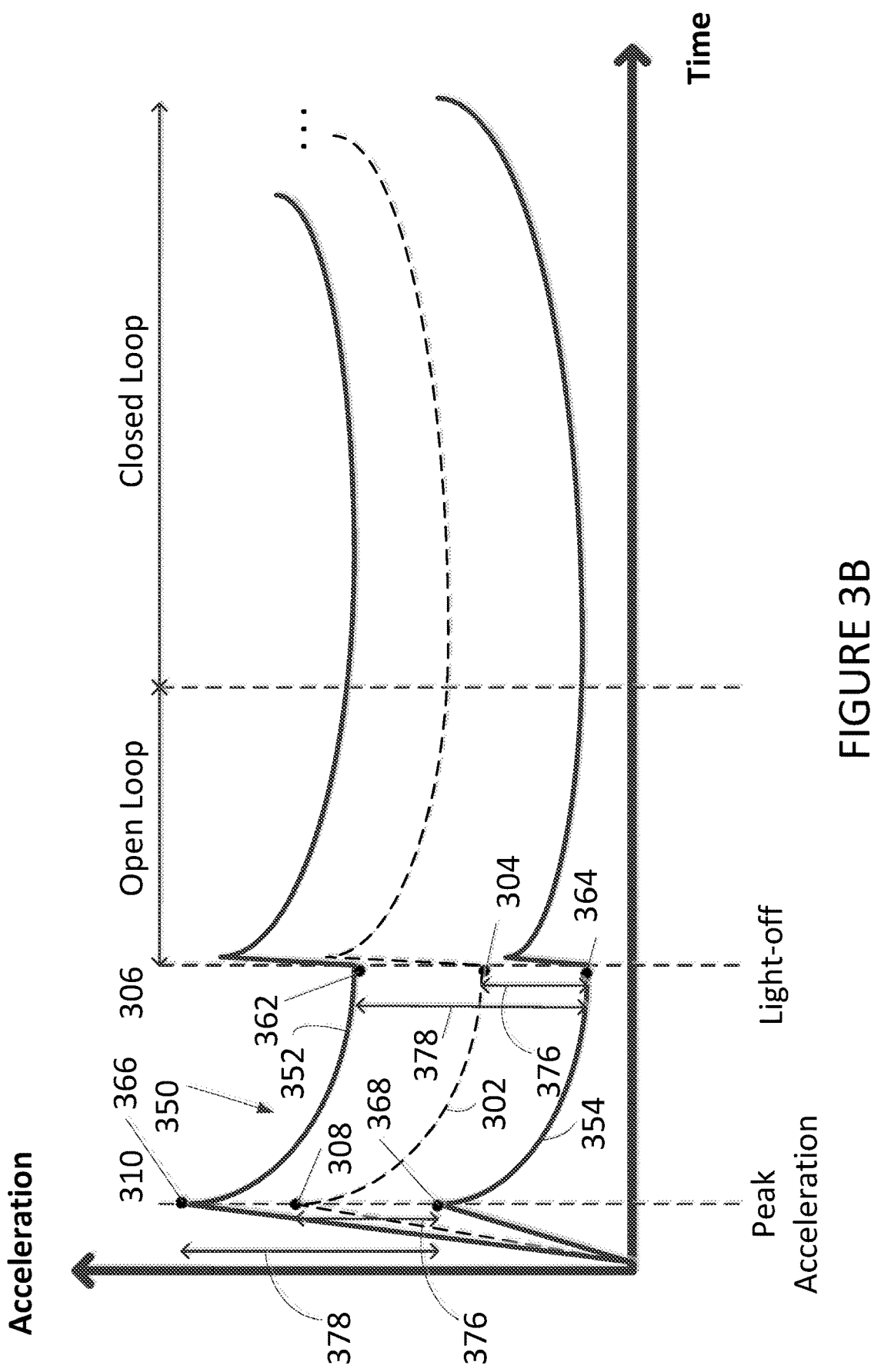
FIG. 3B is an example graphical representation of acceleration bands.

At step 204, the rotational acceleration measurement of the engine 10 is compared to an acceleration band having a maximum threshold and a minimum threshold. With additional reference to FIG. 3B, an acceleration band 350 having a maximum threshold 352 and a minimum threshold 354 is illustrated. In the example illustrated, measured values 304 and 308 are both illustrated with respect to the acceleration band 350. It should be understood that only one of the two values 304, 308, is needed, and that a measured value taken from the rotational acceleration 302 other than measured values 304, 308 may also be used.

In accordance with an embodiment, the comparison of the rotational acceleration measurement to the acceleration band 350 comprises determining a first difference 376 between the rotational acceleration measurement 304, 308 and the minimum threshold 354 and a second difference 378 between the maximum threshold 352 and the minimum threshold 354.

The comparison of the rotational acceleration measurement 304, 308 to the acceleration band 350 may comprise determining a ratio between the first difference and the second difference. For example, the ratio may be defined as follows:

$$\text{Ratio} = \frac{ACC - T\min}{T_{max} - T\min} \qquad (1)$$

In equation (1), $T_{max}$ is the maximum threshold 352, $T_{min}$ is the minimum threshold 354, and ACC is the rotational acceleration measurement 304, 308.

In specific and non-limiting examples of implementation where the rotational acceleration measurement corresponds to a rotational acceleration value measured at a specific time, the maximum threshold 352 and the minimum threshold 354 may correspond to a single maximum threshold value and a single minimum threshold value, respectively. Accordingly, a comparison of the rotational acceleration measured value may be made to the minimum threshold value and the maximum threshold value.

For example, in the case where the rotational acceleration measurement is the last measured value 304 before light-off 306, the maximum threshold 352 and minimum threshold 354 may correspond to a maximum last value 362 before light-off 306 and a minimum last value 364 before light-off 306, respectively. As such, a comparison between the last measured value 304 before light-off 306 may be done to the maximum last value 362 and the minimum last value 364, respectively. A ratio between the first difference 376 and the second difference 378 may thus be determined. By way of a specific and non-limiting example, if the last measured value 304 equals 40 RPM/s, the maximum last value 362 equals 60 RPM/s and the minimum last value 364 equals 25 RPM/s, then, the first difference 376 equals 15 RPM/s, the second difference equals 35 RPM/s and the ratio is 3/7.

Similarly, in the case where the rotational acceleration measurement is the peak measured value 308 pre-light-off, the maximum threshold 352 and the minimum threshold 353 may correspond to a maximum peak value 366 pre-light-off and a minimum peak value 368 pre-light-off, respectively. As such, a comparison between the peak measured value 308 may be done to the maximum peak value 366 and the minimum peak value 368, respectively. For example, a first difference 376 between the peak measured value 308 and the minimum peak value 368 may be determined and a second difference 378 between the maximum peak value 366 and the minimum peak value 368 may be determined. A ratio between the first difference and the second difference may then be determined.

The maximum threshold 352 and the minimum threshold 354 may be set to any suitable value. The maximum threshold 352 may correspond to a maximum engine core acceleration of the engine 10 and the minimum threshold 354 may correspond to a minimum engine core acceleration of the engine 10. Both the maximum engine core acceleration and the minimum engine core acceleration may be a function of a charge level of one or more batteries used to start the engine 10, aircraft speed and/or oil temperature. In accordance with an embodiment, the maximum engine core acceleration of the engine 10 may be achieved with a warm engine, with a maximum aircraft speed allowed for an engine re-start under a maximum engine starter torque. The maximum engine starter torque may be achieved when the batteries are fully charged. Similarly, in accordance with an embodiment, the minimum engine core acceleration of the engine 10 may be achieved with a static cold soak engine, when using maximum allowed depleted batteries.

The maximum threshold 352 and the minimum threshold 354 may be predetermined by measurement(s) and/or simulation(s) of the engine 10. For example, the maximum threshold 352 may be obtained from measuring the rotational acceleration of the engine 10 under the conditions set for maximum engine core acceleration. Similarly, the minimum threshold 354 may be obtained from measuring the rotational acceleration of the engine 10 under the conditions set for the minimum engine core acceleration. By way of another example, a physics based simulation model may be used to determine maximum threshold 352 and the minimum threshold 354.

In other embodiments, the ratio may be between a first difference between the rotational acceleration measurement and the maximum threshold and a second difference between the rotational acceleration measurement and the minimum threshold.

Referring back to FIG. 2, at step 206, an acceleration schedule is determined based on a position of the rotational acceleration measurement of the engine 10 in the acceleration band 350.

In accordance with an embodiment, the position of the rotational acceleration measurement may be used for selecting values for the acceleration schedule between a maximum acceleration schedule and a minimum acceleration schedule by interpolation. The maximum acceleration schedule may comprises values as a function of time for the sub-idle acceleration phase of the engine 10 and the minimum acceleration schedule may comprises values as a function of time for the sub-idle acceleration phase of the engine 10. In other cases, the maximum acceleration schedule may comprises values as a function of engine rotational speed for the sub-idle acceleration phase of the engine 10 and the minimum acceleration schedule may comprises values as a function of engine rotational speed for the sub-idle acceleration phase of the engine 10.

The maximum acceleration schedule may be associated with the maximum threshold 352 and the minimum acceleration schedule may be associated with the minimum threshold 354. For example, the maximum acceleration schedule and the minimum acceleration schedule may be predetermined by measurement(s) and/or simulation(s) of the engine 10 during the sub-idle acceleration phase. Accordingly, the maximum acceleration schedule may be obtained from measuring the rotational acceleration of the engine 10 under the conditions set for maximum engine core acceleration during the sub-idle acceleration phase and the minimum acceleration schedule may be obtained from measuring the rotational acceleration of the engine 10 under the conditions set for minimum engine core acceleration during the sub-idle acceleration phase.

In accordance with an embodiment, the values selected for the acceleration schedule between the maximum acceleration schedule and the minimum acceleration schedule may be selected proportional to the ratio. For example, the values selected for the acceleration schedule may be defined as follows:

$$\text{Values} = (ACC_{max} - ACC_{min}) * R + ACC_{min} \quad (2)$$

In equation (2), $ACC_{max}$ corresponds to the values of the maximum acceleration schedule over time, $ACC_{min}$ corresponds to the values of the minimum acceleration schedule over time, and R corresponds to the ratio as determined in equation (1).

By way of a specific and non-limiting example, if the ratio is determined to be ¾, then the values selected for the acceleration schedule may be ¾ of the values between the maximum acceleration schedule and the minimum acceleration schedule.

In accordance with an embodiment, the acceleration schedule is determined by comparing the position of the rotational acceleration measurement to a threshold value between the maximum acceleration schedule and the minimum acceleration schedule and selecting either the maximum acceleration schedule of the minimum acceleration schedule. For example, if the position of the rotational acceleration measurement is between the threshold value and the maximum acceleration schedule then the maximum acceleration schedule can be selected and if the position of the rotational acceleration measurement is between the threshold value and the minimum acceleration schedule then the minimum acceleration schedule can be selected.

In accordance with an embodiment, the acceleration schedule is determined by comparing the position of the rotational acceleration measurement to tolerance bands and selecting the acceleration schedule corresponding to the position within the tolerance bands. For example, the acceleration schedule may be determined by quantizing the rotational acceleration measurement into one of a plurality of discrete values and selecting a corresponding acceleration schedule associated with the discrete value of the rotational acceleration measurement.

In accordance with an embodiment, determining the acceleration schedule comprises adding a delta to a predetermined sub-idle acceleration schedule. The delta may be selected as a function of the position of the rotational acceleration measurement of the engine 10 in the acceleration band 350.

Other practical implementations for determining the acceleration schedule may be possible by determining the acceleration schedule as a function of the rotational acceleration of the engine 10.

In some embodiments, the method 200 further comprises adjusting the fuel flow to the engine in accordance with the acceleration schedule during sub-idle acceleration. For instance, after light-off 306 of the engine 10, a direct fuel flow may be maintained using a predetermined open loop fuel flow schedule until the sub-idle acceleration phase, during which the acceleration schedule may then be applied. While in the sub-idle acceleration phase, the fuel flow may be adjusted to maintain an acceleration level in accordance with the acceleration schedule using closed loop tracking of the rotational acceleration of engine 10.

Figure 4:
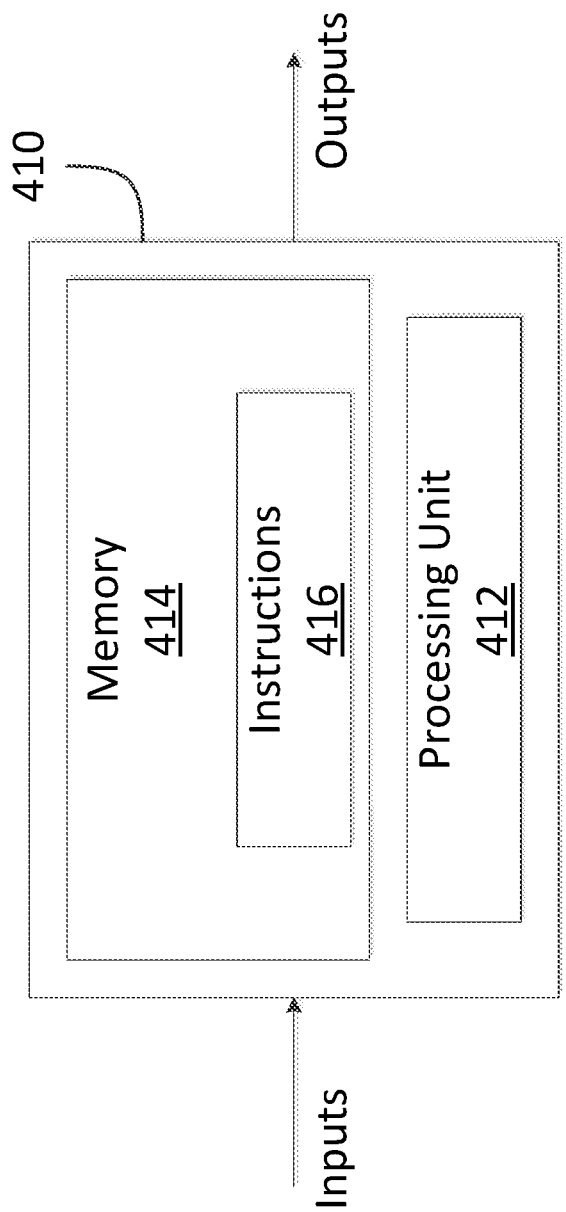
FIG. 4 is a block diagram of an example engine control system.

The method 200 may be implemented by a control system. With reference to FIG. 4, the control system may be implemented by a computing device 410, comprising a processing unit 412 and a memory 414 which has stored therein computer-executable instructions 416. The processing unit 412 may comprise any suitable devices configured to implement the method 200 such that instructions 416, when executed by the computing device 410 or other programmable apparatus, may cause the functions/acts/steps performed as part of the method 200 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the control system can be implemented as part of a full-authority digital engine controls (FADEC) or other similar device, including electronic engine control (EEC), engine control unit (EUC), and the like.

The methods and systems for setting an acceleration schedule of a gas turbine engine described herein may be implemented in a high level procedural or object oriented programming or scripting language, or a combination thereof, to communicate with or assist in the operation of a computer system, for example the computing device 410. Alternatively, the methods and systems for setting an acceleration schedule of a gas turbine engine may be implemented in assembly or machine language. The language may be a compiled or interpreted language. Program code for implementing the methods and systems for setting an acceleration schedule of a gas turbine engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for setting an acceleration schedule of a gas turbine engine may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for setting an acceleration schedule of a gas turbine engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for setting an acceleration schedule for engine start of a gas turbine engine, the method comprising:
   obtaining a rotational acceleration measurement of the engine after the engine is energized in response to a start request;
   comparing the rotational acceleration measurement of the engine to a threshold value within an acceleration band having a maximum threshold and a minimum threshold; and
   determining an acceleration schedule based on a position of the rotational acceleration measurement of the engine in the acceleration band relative to the threshold value.

2. The method of claim 1, wherein determining an acceleration schedule comprise selecting one of a maximum schedule associated with the maximum threshold and a minimum schedule associated with the minimum threshold as a function of the position of the rotational acceleration measurement of the engine relative to the threshold value.

3. The method of claim 1, wherein the maximum threshold has a maximum acceleration schedule associated thereto and the minimum threshold has a minimum acceleration schedule associated thereto, and wherein determining the acceleration schedule comprises selecting values for the acceleration schedule between the maximum acceleration schedule and the minimum acceleration schedule proportional to the position of the rotational acceleration measurement relative to the threshold value.

4. The method of claim 1, wherein the maximum threshold is a maximum engine core acceleration achieved with a warm engine, with a maximum aircraft speed allowed for an engine re-start under a maximum engine starter torque.

5. The method of claim 1, wherein the minimum threshold is a minimum engine core acceleration achieved with a static cold soak engine, when using a maximum allowed depleted batteries.

6. The method of claim 1, wherein the rotational acceleration measurement is a last measured value before light-off, and the maximum threshold and minimum threshold correspond to a maximum last measured value before light-off and a minimum last measured value before light-off, respectively.

7. The method of claim 1, wherein the rotational acceleration measurement is a peak measured value pre-light-off, and the maximum threshold and minimum threshold correspond to a maximum peak measured value pre-light-off and a minimum peak measured value pre-light-off.

8. The method of claim 1, wherein determining the acceleration schedule comprises adding a delta to a predetermined sub-idle acceleration schedule, the delta selected as a function of the position of the rotational acceleration measurement of the engine in the acceleration band.

9. A system for setting an acceleration schedule for engine start of a gas turbine engine, the system comprising:
   a processing unit; and
   a non-transitory computer-readable memory having stored thereon program instructions executable by the processing unit for:
   obtaining a rotational acceleration measurement of the engine after the engine is energized in response to a start request;
   comparing the rotational acceleration measurement of the engine to a threshold value within an acceleration band having a maximum threshold and a minimum threshold; and
   determining an acceleration schedule based on a position of the rotational acceleration measurement of the engine in the acceleration band relative to the threshold value.

10. The system of claim 9, wherein determining an acceleration schedule comprise selecting one of a maximum schedule associated with the maximum threshold and a minimum schedule associated with the minimum threshold as a function of the position of the rotational acceleration measurement of the engine relative to the threshold value.

11. The system of claim 9, wherein the maximum threshold has a maximum acceleration schedule associated thereto and the minimum threshold has a minimum acceleration schedule associated thereto, and wherein determining the acceleration schedule comprises selecting values for the acceleration schedule between the maximum acceleration schedule and the minimum acceleration schedule proportional to the position of the rotational acceleration measurement relative to the threshold value.

12. The system of claim 9, wherein the maximum threshold is a maximum engine core acceleration achieved with a warm engine, with a maximum aircraft speed allowed for an engine re-start under a maximum engine starter torque.

13. The system of claim 9, wherein the minimum threshold is a minimum engine core acceleration achieved with a static cold soak engine, when using a maximum allowed depleted batteries.

14. The system of claim 9, wherein the rotational acceleration measurement is a last measured value before light-off, and the maximum threshold and minimum threshold correspond to a maximum last measured value before light-off and a minimum last measured value before light-off, respectively.

15. The system of claim 9, wherein the rotational acceleration measurement is a peak measured value pre-light-off, and the maximum threshold and minimum threshold correspond to a maximum peak measured value pre-light-off and a minimum peak measured value pre-light-off.

16. The system of claim 9, wherein determining the acceleration schedule comprises adding a delta to a pre-determined sub-idle acceleration schedule, the delta selected as a function of the position of the rotational acceleration measurement of the engine in the acceleration band.

17. A computer readable medium having stored thereon program code executable by a processor for setting a fuel flow schedule for starting a gas turbine engine of an aircraft, the engine having a compressor inlet and a compressor outlet, the program code comprising instructions for:
   obtaining a rotational acceleration measurement of the engine after the engine is energized in response to a start request;
   comparing the rotational acceleration measurement of the engine to a threshold value within an acceleration band having a maximum threshold and a minimum threshold; and
   determining an acceleration schedule based on a position of the rotational acceleration measurement of the engine in the acceleration band relative to the threshold value.

18. The computer readable medium of claim 17, wherein determining an acceleration schedule comprise selecting one of a maximum schedule associated with the maximum threshold and a minimum schedule associated with the minimum threshold as a function of the position of the rotational acceleration measurement of the engine relative to the threshold value.

19. The computer readable medium of claim 17, wherein the maximum threshold has a maximum acceleration schedule associated thereto and the minimum threshold has a minimum acceleration schedule associated thereto, and wherein determining the acceleration schedule comprises selecting values for the acceleration schedule between the maximum acceleration schedule and the minimum acceleration schedule proportional to the position of the rotational acceleration measurement relative to the threshold value.

20. The computer readable medium of claim 17, wherein the maximum threshold is a maximum engine core acceleration achieved with a warm engine, with a maximum aircraft speed allowed for an engine re-start under a maximum engine starter torque, and wherein the minimum threshold is a minimum engine core acceleration achieved with a static cold soak engine, when using a maximum allowed depleted batteries.

\* \* \* \* \*